United States Patent

[11] 3,621,437

| [72] | Inventor | James E. Mading<br>Milwaukee, Wis. |
|---|---|---|
| [21] | Appl. No. | 43,772 |
| [22] | Filed | June 5, 1970 |
| [45] | Patented | Nov. 16, 1971 |
| [73] | Assignee | Cutler-Hammer, Inc.<br>Milwaukee, Wis. |

[54] BOLT-ON STRAIN GAGE TRANSDUCER STRUCTURE
8 Claims, 3 Drawing Figs.

[52] U.S. Cl. ............................................. 338/5,
 73/88.5, 338/6
[51] Int. Cl. .................................................. G01b 7/18
[50] Field of Search ........................................ 338/2, 5, 6;
 73/88.5

[56] References Cited
UNITED STATES PATENTS

| 2,350,072 | 5/1944 | Simmons, Jr. ................ | 73/88.5 X |
| 2,453,550 | 11/1948 | Statham ....................... | 338/5 |
| 2,722,587 | 11/1955 | Buzzetti et al. ................ | 73/88.5 X |
| 3,033,034 | 5/1962 | Ziggel ........................... | 338/5 X |
| 3,351,880 | 11/1967 | Wilner ........................... | 338/6 |

Primary Examiner—Rodney D. Bennett
Assistant Examiner—R. Kinberg
Attorney—Hugh R. Rather ABSTRACT: A resistance strain gage arrangement is mounted upon a strain bar housed within a protective enclosure. Opposite ends of the strain bar are provided with upper and lower spherical surfaces which are received within conical recesses of upper and lower washer-type seats. The spherical ends and seats have oversized clearance holes for a pair of screws which extend through the assembly at each end of the strain bar to provide a gimballike mounting for the structure to compensate for surface and bolt hole irregularities. Once firmly tightened to the surface to be monitored, the structure is designed to transmit strain from the surface to the strain bar where it is sensed by the resistance strain gage arrangement.

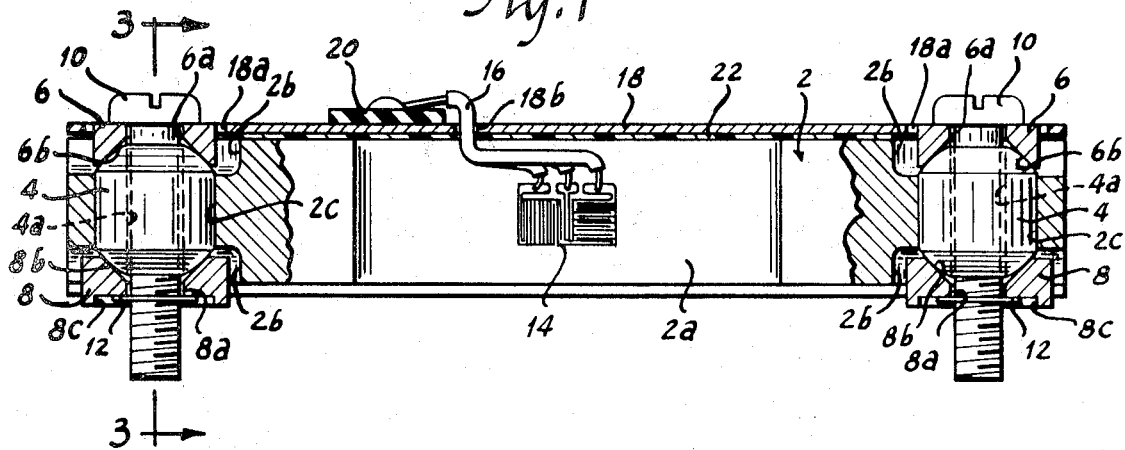
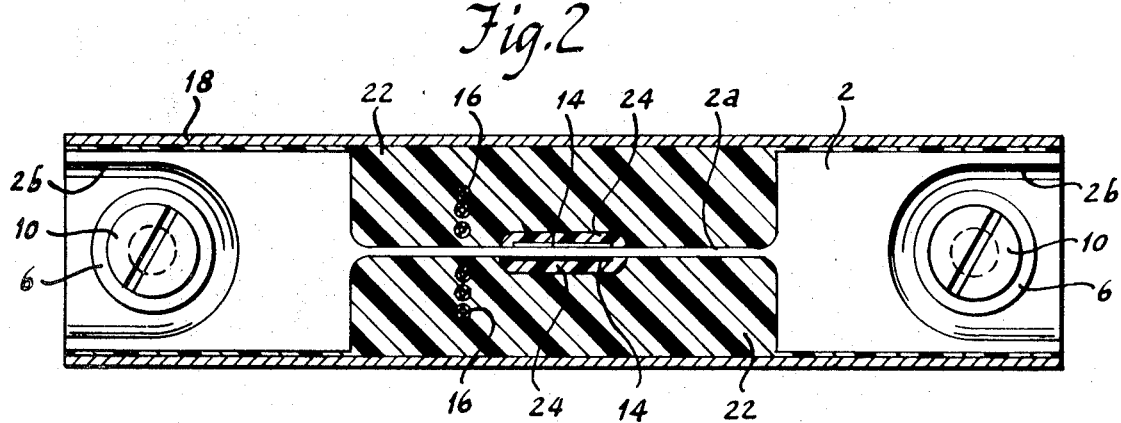
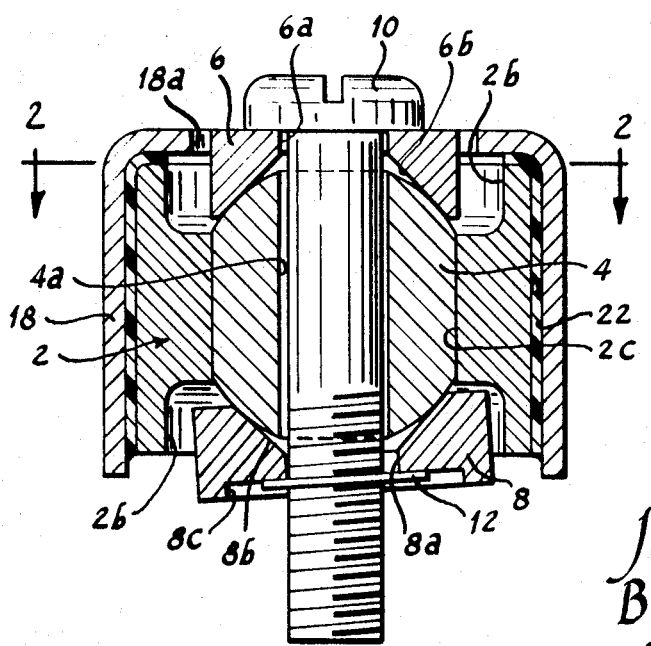
Inventor
James E. Mading
By H R Rather
Attorney

3,621,437

BOLT-ON STRAIN GAGE TRANSDUCER STRUCTURE

BACKGROUND OF THE INVENTION

This invention relates to resistance strain gage transducers and more particularly to improved structures therefor.

Although variable resistance strain gages have been known for some time, they did not become popular until improved electronic amplifiers and circuits were available. Advances of solid state electronics and integrated circuitry have reduced both size and cost of associated equipment to permit the strain gage to be used for applications outside of the laboratory. The practical applications are limited however by the delicate nature of the strain gage and the conditions normally required for mounting the strain gage. Often the devices are damaged in handling prior to or during the mounting operation by personnel not accustomed to such delicate devices. Other problems occur in achieving proper alignment of the strain gage upon the surface and maintaining the gage in a nonflexed condition.

SUMMARY OF THE INVENTION

It is a primary object of this invention to provide a resistance strain gage transducer structure which may be readily mounted to a surface without incurring damage to the structure.

It is a further object of this invention to provide a resistance strain gage transducer structure which may be mounted to a surface by normal in the field procedures.

It is a further object of this invention to provide a resistance strain gage transducer structure which is particularly rugged and capable of normal handling without incurring damage thereto.

These and other objects and advantages of this invention will become more apparent in the following specification and claims when read in conjunction with the accompanying drawings.

BRIEF DESCRIPTION OF THE DRAWINGS

FIG. 1 is a cross-sectional view of the resistance strain gage transducer of this invention taken generally along the longitudinal centerline thereof but showing an intermediate portion in elevation;

FIG. 2 is a longitudinal sectional view taken just below the upper wall of a cover member for the transducer as indicated by the line 2—2 in FIG. 3; and FIG. 3 is a transverse cross-sectional view of the transducer taken through one of the mounting assemblies as indicated by the line 3—3 in FIG. 1, but drawn to a greater scale.

DESCRIPTION OF THE PREFERRED EMBODIMENT

A primary member of the resistance strain gage transducer device disclosed herein is a strain bar 2 preferably made of aluminum and having a narrow intermediate web portion 2a. The ends of strain bar 2 have recesses 2b formed in the upper and lower surfaces, the recesses 2b also opening to the opposite end surfaces of the bar. Also formed in the ends of strain bar 2 are circular holes 2c which communicate between the upper and lower recesses 2b at the respective ends.

Each of the holes 2c is provided with an aligning ball 4 which has a cylindrical midportion received within the hole 2c and spherical segments formed on the ends which project beyond the top and bottom surfaces of the bar 2 within the recesses 2b. The ball 4 is preferably formed of steel and pressed into the hole 2c, however alternate methods such as cementing may be employed equally as well to secure the ball 4 to the strain bar 2. Each ball 4 is also provided with a through hole 4a formed coaxially with the cylindrical surface.

A pair of cylindrical upper seats 6 are provided, one for each end of the transducer. Seats 6 have through holes 6a at their center and one surface is provided with a frustoconical recess 6b which is presented downwardly to engage the spherical upper surface of the respective ball 4.

Similarly, a pair of cylindrical lower seats 8 are provided which have through holes 8a at their respective centers and a frustoconical recess 8b formed in one surface. The latter surface of the respective lower seats 8 is presented upwardly to the transducer structure wherein the lower spherical surface of the respective ball 4 is received in the frustoconical recess 8b.

A pair of screws 10 are inserted from the upper portion of the transducer at the respective ends to extend through the aligned openings 6a, 4a and 8a in the upper seat 6, ball 4 and lower seat 8, respectively, to project beyond the lower seat 8. A retainer washer 12 is positioned over the threaded shank of each screw 10 at the outer end to maintain the screw and seats assembled to the transducer during handling. A cylindrical recess 8a is cut into the lower surface of each lower seat 8 to provide the necessary clearance for enveloping the retainer 12 upon mounting of the transducer to a surface, and to insure that the load-bearing surface is near the periphery of seat 8.

Two pairs of resistance strain gages 14 of a commercially available metal-foil type are bonded to the web 2a, one pair at each of the opposite sides of the web, by any of the common mounting techniques for strain gages. The gages 14 are arranged to sense tension or compression strain in the longitudinal direction of the strain bar 2 and are further arranged so that the gages produce equal opposing signals which cancel out strain components due to loadings in other than the longitudinal direction. A plurality of wire leads 16 are connected to the strain gages 14 and in the embodiment disclosed in the drawings are brought outside the transducer at the upper side. If desired, the wires 16 could be brought out the end of the transducer by forming holes in the strain bar 2 or out either side.

A channel shaped aluminum cover 18 encloses the top and two sides of the transducer. Clearance holes 18a are provided in the top at opposite ends for screws 10 and upper seats 6 and openings 18b are also provided in the top for wire leads 16. A terminal board 20 is bonded to the top of cover 18 to which wire leads are secured by soldering or the like and to which system wires may be attached. It is to be understood that the terminal board could be replaced by a suitable one of various plug-in connector modules available commercially if so desired.

The assembly as heretofore described is next inverted and the cavities between web 2a, the sides of cover 18 and the end portions of strain bar 2 are filled with an elastomer material 22 such as polyurethene or the like. Prior to filling the cavities a cushion of soft elastomer 24, a silicone grease or other similar material may be spread over the strain gages 14 to act as a cushion and prevent the gages from experiencing the strains in the elastomer material 22. As seen in the drawings, some of the material 22 also extends into the cracks between the ends of bar 2 and cover 18. The elastomer material 22 is a noncompressible material and functions to prevent transverse movement and buckling of the web 2a, which movement could damage the strain gages 14. While not limited to polyurethene, the material chosen for the fill should have a low shrink factor in curing and should not serve as a corrosion agent with the material of the strain bar, gages and gage leads.

The completed transducer device can be seen to provide good protection for the strain gages 14 when handled prior to assembly. The transducer device can be readily bolted onto any generally flat surface by drilling and tapping two holes for screws 10, and subsequently brushing away the loose chips and scale. Ordinary shop hand drilling techniques may be employed to drill and tap the holes. Clearance holes 4a, 6a and 8a have intentionally been made oversize to accommodate center-to-center tolerance variances as well as some angular difference between the axes of the holes.

The gimbal mounting feature provided at each end by the ball-and-socket joints permit surface deviations within the mounting area without affecting the transducer. As seen in FIG. 3, the lower seat 8 may be canted several degrees from the horizontal prior to final tightening of screws 10. Initial finger tightening of the screws permits the ball-and-socket members to seek their own relative positions and final tightening of the screws 10 clamps the upper seat 6 and lower seat 8 around the ball 4 to rigidly secure the transducer to the surface. When so mounted, strains occurring in the material to which the transducer is mounted are transmitted to the strain bar via the bolted connections at the ends.

I claim:

1. A strain gage transducer adapted to be bolted to a surface of a material to be monitored, said strain gage transducer comprising, in combination:

an elongate member having resistance strain gage means mounted thereon and mounting means at opposite ends each comprising:

seat members positioned on opposite sides of said elongate member, outer surfaces of said seat members being substantially flat and adjacent surfaces of said seat members and said elongate member being formed to provide ball-and-socket joints therebetween;

aligned holes through said seat members and said elongate member; and screw means extending through said aligned holes to be threaded into a corresponding tapped hole in said surface to press said substantially flat outer surface of the lower one of said seat members firmly against said surface and to clamp said elongate member securely between said seat members.

2. The combination according to claim 1 wherein said adjacent surfaces of said seat members and said elongate member which provide said ball-and-socket joints comprise spherical surfaces received within frustoconical recesses.

3. The combination according to claim 2, wherein said frustoconical recesses are formed on the inner surfaces of the respective seat members and said spherical surfaces are provided on the respective opposite sides of said elongate member.

4. The combination according to claim 3, wherein said spherical surfaces comprising portions of a ball member secured within an opening in said elongate member at the respective end thereof, said portions projecting outwardly of the opposite surfaces of said elongate member at the respective end.

5. The combination according to claim 1, wherein said aligned holes through said seat members and said elongate member are formed to a diameter to provide greater than normal clearance for said screw means.

6. The combination according to claim 1 wherein said elongate member has an intermediate web portion of substantially reduced width, said resistance strain gage means being mounted on said intermediate web portion; together with:

an elongated cover member disposed along at least three sides of said elongate member; and an elastomer material disposed in the spaced between said intermediate web portion and said cover member to prevent movement of said web in a direction transversely of the longitudinal dimension of said elongate member.

7. The combination according to claim 6 together with electrical connector means mounted to said cover member and electrical conductor means connected between said resistance strain gage means and said electrical connector.

8. The combination according to claim 7, wherein a soft material is disposed over said strain gage means to provide a protective cushion for the strain gage means from said elastomer material.

* * * * *